Patented Jan. 8, 1946

2,392,768

UNITED STATES PATENT OFFICE 2,392,768

TEMPORARY PROTECTIVE COATINGS

Joseph D. Ryan, Toledo, Ohio, assignor to Libbey-Owens-Ford Glass Company, Toledo, Ohio, a corporation of Ohio No Drawing. Application June 18, 1942, Serial No. 447,599

3 Claims. (Cl. 117—6)

The present invention relates to temporary protective coatings for protecting glass from scratches, digs, etc., during processing.

During the manufacture of glass products, especially curved sheets or plates of glass, extremely large glass sheets or plates, or bullet-resisting glass, a great deal of handling is required in processing and especially in the grinding and polishing of the edges of the glass. Where the glass is heavy and difficult to handle, the danger of the glass being scratched or otherwise marred is materially increased, and these scratches cannot be removed by so-called "scratch polishing" due to the visibility distortion introduced in removing the scratches. For example, in manufacturing large tempered glass doors, which are extremely heavy, scratches are a frequent cause of rejection, and this is also true of bullet-resisting glass which weighs approximately 13 pounds per square foot per inch of thickness. A great deal of the bullet-resistng glass made at present is at least 1½ inches thick and, in some cases, the thickness may be even 2½ inches to 3 inches so that some lights may weigh as much as 100 pounds.

To illustrate, in the edging operations, the glass sheets or plates are frequently laid flat on a horizontal table and the edge thereof to be ground brought into contact with a rotating abrasive grinding wheel. To facilitate the grinding operation, water is supplied to the grinding wheel and, as the small particles of ground glass and abrasive leave the wheel, they frequently come into contact with the glass surfaces, producing scratches therein.

Attempts have been made to overcome the rejection of glass resulting from scratches during edging by coating the glass surfaces with materials such as shellac or other lacquers of conventional type, for example nitrocellulose, ethyl cellulose resins, etc. These materials, however, are all characterized by the fact that they are extremely difficult and costly to remove from the glass and, in most instances, the coatings formed of these materials are not very hard or scratch resistant and, in some instances, result in a staining of the glass. While it is true that some degree of protection is afforded to the glass by such coatings, they are far from satisfactory.

It is therefore an object of this invention to provide an improved temporary protective coating for protecting glass surfaces during the handling and edging operations which is hard and scratch resistant and which offers good protection to the glass surfaces without having any detrimental effect thereon.

Another object of the invention is to provide an improved temporary protective coating formed of a material which can be applied to the glass surfaces in a rapid and convenient manner and also readily removed therefrom after it has served its purpose.

In accordance with the invention, the coating material employed comprises a base of alcohol reacted urea formaldehyde resin dissolved in suitable thinners and solvents and a catalyst. The ingredients are mixed to give a solution of the desired consistency which is then applied to the glass by spraying, brushing or other suitable means. Naturally, if the coating is to be applied by brushing a thicker consistency will be employed than would be the case if a spraying operation is preferred. The group of resins found suitable is a reaction product of urea, formaldehyde and a monohydric aliphatic alcohol. These resins may be correctly termed "monohydric aliphatic alcoholated urea formaldehyde resins." Among the types of alcohol reacted urea formaldehyde resins that have been found to work satisfactorily are the methylated, ethylated, propylated, butylated and isobutylated urea formaldehyde resins. The urea formaldehyde resins of the type herein employed are characterized by extremely high hardness, being two to three times as hard as any of the natural resins, cellulosic materials or conventional vinyl resins so far produced and sold for the manufacturer of plastics and coating materials.

The urea formaldehyde resin on being reacted with the alcohol is thinned with appropriate solvents and thinners such as, for example, aliphatic alcohols, toluene, hydrogenated petroleum derivatives, V. M. P. naphtha, etc. As will be understood, a wide variety of thinners may be employed and the ratio of thinners as well as the boiling points of the thinners will be so governed as to give the desired evaporation rate, depending upon the method of application being employed.

A catalyst is also added to accelerate the setting of the resin. It is preferable to use an acid catalyst in conjunction with the resin material to insure rapid setting of the coating; the presence of the acid catalyst causing condensation of the resin reactive groups to yield a hardened form. As examples of acid catalysts that may be successfully employed, the following may be mentioned: phosphoric acid, mono di- or triphosphoric esters of monohydric aliphatic alcohols, sulphuric acid, acetic acid, oxalic acid, propionic acid, etc. Approximately 1% to 2% of the acid catalyst is added based on the weight of the resin employed. The acid catalyst is preferably added to the thinners and the thinner and the solution of the resin mixed in a governed proportion to yield the necessary concentration of acid catalyst in the final mix to be applied. When using the proper amount of catalyst with the alcohol reacted urea formaldehyde resin, the coating dries instantly on spraying or dries quickly on brushing, leaving a hard, extremely scratch resistant film. The use of the catalyst is essential to rapid hardening of the coating; otherwise heat or a relatively long drying time may be necessary.

By way of example, satisfactory spray coatings were produced from a material having the following composition:

|  | Parts |
|---|---|
| Isobutylated urea formaldehyde resin | 40 |
| Isobutyl alcohol | 30 |
| Toluene | 30 |
| Hydrogenated naphtha, "Troluoil" or "Solvesso No. 2" | 30 |
| 75 per cent phosphoric acid catalyst | .4 |

The above composition can be modified by substituting for the isobutylated urea formaldehyde resin substantially the same amount of methylated, ethylated, propylated or butylated urea formaldehyde resins.

After being coated, the glass can be put through all of the edging and handling operations necessary to bring it to completion without danger of scratching or injuring the surfaces thereof. Just prior to shipping or at any other desired point in the processing of the glass, the protective coating can be removed without staining or otherwise adversely affecting the glass. Unlike most coatings heretofore used, the protective coatings of this invention are insoluble in all organic solvents and oils and extremely resistant to the cold water ordinarily used in the edging operation. However, the urea formaldehyde resins of this type have a fairly high water absorption, say about 5%, and when the coating is brought into contact with hot water for a short period of time, the coating absorbs the water and undergoes shrinkage which results in the coating leaving the glass as an integral sheet. Before being treated with the hot water, the coating of this invention adheres extremely well to glass and can only be removed by use of a razor blade, which procedure would be dangerous to employ because of the possibility of producing scratches in the glass surface.

I claim:

1. A temporary coating on a glass article produced by applying a composition comprising:

|  | Parts |
|---|---|
| Isobutylated urea formaldehyde resin | 40 |
| Isobutyl alcohol | 30 |
| Toluene | 30 |
| Hydrogenated naphtha, "Troluoil" or "Solvesso No. 2" | 30 |
| 75 per cent phosphoric acid catalyst | .4 | to said glass.

2. The method of temporarily protecting glass products which consists in applying to the glass a coating comprising a monohydric aliphatic alcoholated urea formaldehyde resin and subsequently removing said coating without injury to the glass by treating the coating with hot water to cause it to absorb the water and undergo shrinkage to a point where it will leave the glass as a substantially integral sheet.

3. The method of temporarily protecting glass products which consists in applying to the glass a coating comprising an isobutyl alcohol reacted urea formaldehyde resin and subsequently removing said coating without injury to the glass by treating the coating with hot water to cause it to absorb the water and undergo shrinkage to a point where it will leave the glass as a substantially integral sheet.

JOSEPH D. RYAN.